United States Patent [19]

Hunt

[11] Patent Number: 5,047,632

[45] Date of Patent: Sep. 10, 1991

[54] METHOD FOR DETERMINING DYNAMIC FLOW CHARACTERISTICS OF MULTIPHASE FLOWS

[75] Inventor: Andrew Hunt, Royston, England

[73] Assignee: Schlumberger Technology Corporation, Houston, Tex.

[21] Appl. No.: 524,246

[22] Filed: May 16, 1990

[30] Foreign Application Priority Data

May 27, 1989 [GB] United Kingdom ............... 8912256

[51] Int. Cl.$^5$ ...................... G01F 1/74; G01V 5/04
[52] U.S. Cl. .................................. 250/302; 250/259; 250/260; 250/303
[58] Field of Search ............... 250/302, 303, 259, 260

[56] References Cited

U.S. PATENT DOCUMENTS

| | | | |
|---|---|---|---|
| 2,412,363 | 12/1946 | Silverman | 324/325 |
| 2,829,518 | 4/1958 | Rumble et al. | 73/155 |
| 3,395,277 | 7/1968 | Mayer, Jr. et al. | 250/260 |
| 3,784,828 | 1/1974 | Hayes | 250/260 |
| 4,107,525 | 8/1978 | Hart, Jr. | 250/303 |
| 4,166,215 | 8/1979 | Anderson | 250/260 |
| 4,166,216 | 8/1979 | Cubberly, Jr. | 250/260 |
| 4,482,806 | 11/1984 | Wagner, Jr. et al. | 250/260 |
| 4,861,986 | 8/1989 | Arnold | 250/260 |
| 4,899,289 | 2/1990 | Appel | 364/484 |

FOREIGN PATENT DOCUMENTS

| | | |
|---|---|---|
| 0167233 | 8/1986 | European Pat. Off. |
| 1150546 | 4/1985 | U.S.S.R. |
| 1329051 | 9/1973 | United Kingdom |
| 1330618 | 9/1973 | United Kingdom |
| 1352884 | 5/1974 | United Kingdom |
| 1515143 | 6/1978 | United Kingdom |
| 2041761 | 9/1980 | United Kingdom |
| 2116706 | 9/1983 | United Kingdom |
| 2180065 | 3/1987 | United Kingdom |
| 2186981 | 8/1987 | United Kingdom |
| 2194058 | 2/1988 | United Kingdom |

OTHER PUBLICATIONS

Stanislaw Szpilowski, Grazyna Strelczak, Ryszard Winnicki, "Radioactive Tracer Method as an Instrument for Testing Effectiveness of Effluent Treatment Installations and Mixing Patterns in Natural Streams." *Nukleonika*, vol. 21, No. 5 (1976) pp. 603-618.

*Primary Examiner*—Constantine Hannaher
*Attorney, Agent, or Firm*—Henri Dupont; Martin Hyden; John J. Ryberg

[57] ABSTRACT

A method for determining at least one dynamic flow characteristic of a multiphase flow circulating in a pipe, the flow being composed of a lighter dispersed-phase and a heavier continuous-phase. A tracer is discharged (or activated) into the flow at a chosen first location in the pipe by mixing (or activating) a portion of the tracer with the continuous-phase therein. The tracer concentration at a chosen second location in the pipe is measured with a detector as a function of time t, so as to obtain a signal S(t). Then a relationship is fitted to the signal S(t) so as to derive the values of the velocity U of the continuous phase and/or of a dispersion coefficient k. The slip velocity $v_s$ of the dispersed phase relative to the velocity of the continuous phase is also advantageously determined. From the values of velocities U and $v_s$ and from the volume fraction $y_1$ of the continuous phase in the pipe (obtained by an ancillary measurement), the volumetric flow rates of the continuous and dispersed phases are determined.

10 Claims, 2 Drawing Sheets

METHOD FOR DETERMINING DYNAMIC FLOW CHARACTERISTICS OF MULTIPHASE FLOWS

The present invention is directed to a method for determining the dynamic flow characteristics of multiphase flows, and more particularly the determination of the velocity and flow rate of each phase of a two-phase mixture flowing within a pipe. The invention is particularly useful for determining the velocities and/or flow rates of the two phases of a fluid flowing in a hydrocarbon well, the fluids being water, oil and/or gas. The invention makes use of a fluid miscible tracer discharged into the flow.

A common method of monitoring the flow of fluids is to introduce some chemical or physical identifier, known as tracer, into the flow and then to monitor the passage of that tracer by means of some measurement. Examples include the introduction of saline solution into water flows and using electrical conductivity as a monitor, or introducing radioactive materials and using radiation detectors to track the progress of the fluid. A tool, called a Tracer Ejector Tool "TET", for injecting tracers into wellbore flows is commercialised by the company Schlumberger, frequently for monitoring the flows of water in injection wells. This tool and the methods of acquiring and interpreting the data are disclosed in U.S. Pat. Nos. 4,166,215 and 4,166,216. These patents relate to a tracer-survey method and apparatus for obtaining measurements representative of the dynamic flow characteristics of the continuous-phase present at one or more depth locations in a production well containing a lighter discontinuous-phase wellbore fluid. Minor amounts of suitable radioactive tracer are periodically discharged into the fluids at a selected depth location in the production well. Thereafter, by simultaneously monitoring the level of radioactivity present in the wellbore fluids above and below that depth location, measurements are obtained which are representative of one or more dynamic flow characteristics of the heavier continuous-phase at the depth location in the wellbore. These measurements are based on the travel time of the tracer from the location where it is discharged in the flow to another location where it is detected. However, the interpretation of the results has proved to be difficult due to the "smearing out" of the signal caused by the extensive mixing generated by the passage of the bubbles or droplets of the dispersed phase. Due to the large width of the signals obtained, it is difficult to locate precisely the peaks of the signals and therefore large errors are incurred by considering the time difference in peak arrival as representing the transit velocity of the flow.

The present invention is based on a model of the mixing processes of the tracer into the flow and relates to a method of interpreting the tracer signal, such as the one obtained with the TET tool, in multiphase flow to give the velocity of two components: one being the continuous phase and the second being the dispersed phase whose passage causes mixing. The volumetric flow rates are then determined using these velocities and ancillary measurements. For example, in flow of oil and water the velocity of both phases may be obtained with either a water-base tracer or an oil-based tracer depending on which phase is continuous. In three-phase flow of oil, water and gas, a water-based tracer may be used to determine the water (the continuous phase) and gas (the dispersed phase) velocities, while an oil-based tracer may be used to determine the oil and gas velocities.

More precisely the present invention relates to a method for determining at least one dynamic flow characteristic of a multiphase flow circulating in a pipe, said flow being composed of at least a dispersed-phase and a continuous-phase, wherein:

a tracer is discharged (or activated) into the flow at a chosen first location in the pipe by mixing (or activating) at least a portion of the tracer with the continuous-phase therein;

the tracer concentration at least a chosen second location in the pipe is measured with a detector as a function of time t, so as to obtain at least one signal S(t); and a relationship is fitted to the signal S(t) so as to derive the values of the velocity U of the continuous phase and/or of a dispersion coefficient k.

The slip velocity $v_s$ of the dispersed phase relative to the velocity of the continuous phase is also advantageously determined.

From the values of velocities U and $v_s$ and from the volume fraction $y_1$ of the continuous phase in the pipe (obtained by an ancillary measurement), the volumetric flow rates of the continuous and dispersed phases are determined.

The invention together with further objects and advantages thereof, may be best understood by way of the following description of a method employing the principles of the invention as illustrated in the accompanying drawings, in which.

Figures 1, 2:
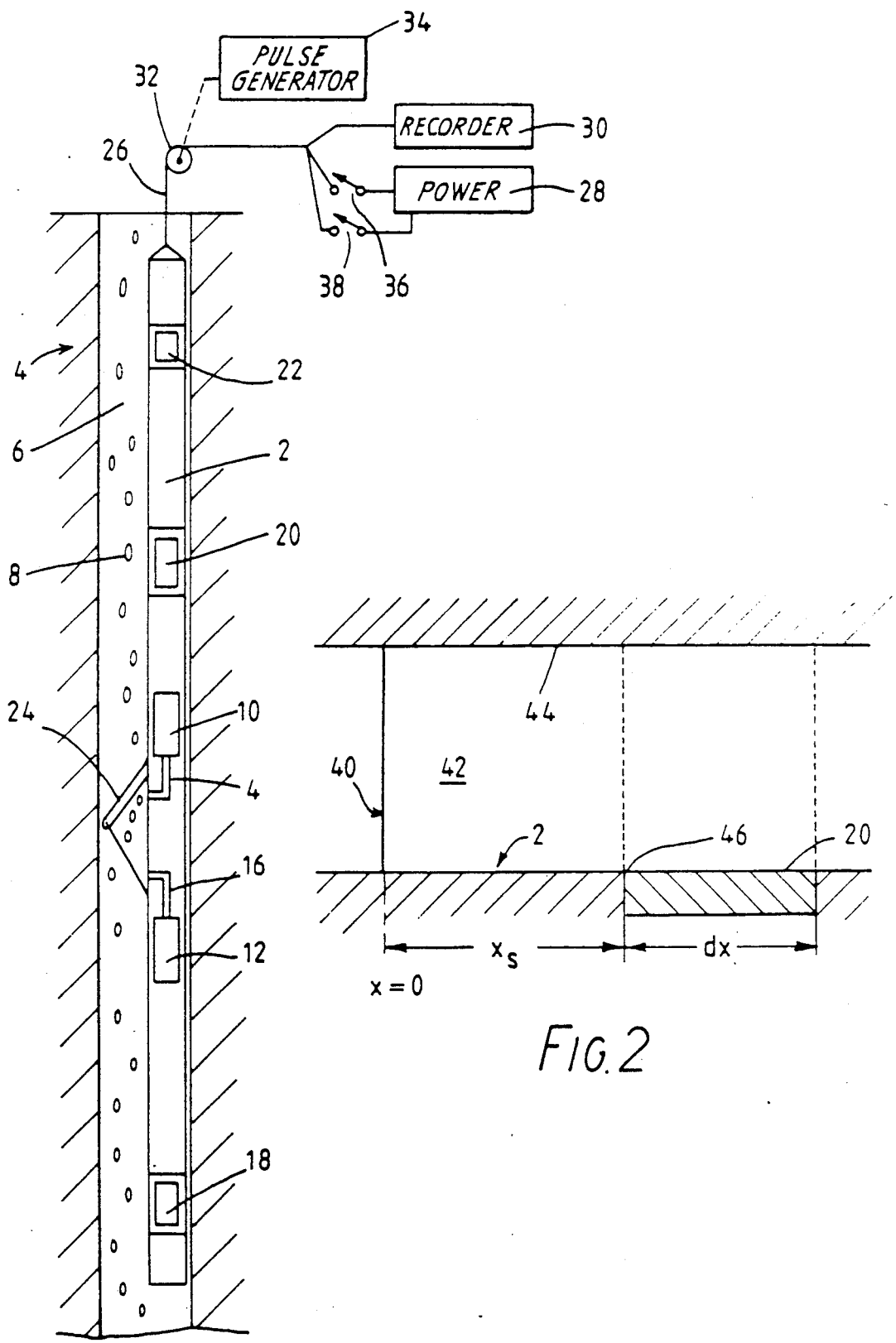
FIG. 1 is a schematic presentation of a tracer-survey tool of the prior art, which can be used to obtain the signals to interpret in accordance with the present invention.
FIG. 2 illustrates the measurements.

FIG. 1 shows schematically a tracer-survey tool 2 of the prior art positioned in an oil well 4 for monitoring the multiphase flow in the well. The flow is represented by a liquid 6 which is the continuous phase and droplets or bubbles 8 which are the dispersed phase. The continuous phase could be water and the discontinuous phase could be oil or gas. The tool comprises two chambers 10 and 12 containing two different tracers which can be released sequentially into the flow through the passages 14 and 16 respectively, by actuating from the surface valves (not represented) located at the exits of the chambers 10 and 12 or in the passages 14 and 16. As a principle, only one tracer is sufficient for practising the invention. The tool also comprises three identical detectors 18, 20 and 22 for monitoring the passage of the tracer, or tracers, carried by the flow and arriving in front of the detectors. The detector 18 is located upstream of the tracer-ejector chambers and the detectors 20 and 22 are located downstream of these chambers. To practise the invention, only the detector 20 is needed, although detectors 18 and 20 are preferably used and all three detectors 18, 20 and 22 are more preferably used. As a fact the three outputs of the detectors can be used for a consistency check of the signals, but the interpretation can be done on one signal alone. The tracer used must be miscible in the continuous phase of the fluid at the location in the well where the tool is located. It should be noticed that the continuous phase in case of an oil/water mixture, could be the water near the bottom of the well, but could be the oil near the surface. Having two chambers 10 and 12 is therefore useful. Chamber 10 could comprise for example, a tracer which is water miscible and the chamber 12 could include the same tracer but made oil-soluble by mixing it in an oil emulsion. The tracers in that case are ejected at different times. A large variety of tracers could be used. It could be salt water for example, if the fluid in the well includes fresh water, but conversely the tracer could be fresh water if the liquid in the well comprises salt water. In such a case the detectors would be conductivity sensors. The tracers could also be dyes and in such a case the detectors would be optical sensors. The tracers could also be short-life radioactive tracers and the detectors would be nuclear sensors, usually sensitive to gamma radiation. The radioactive tracers could be of the type activated to make them radioactive, such as substances containing oxygen made radioactive by neutron irradiation. The tool in that case would include a pulsed-neutron source.

A deflector 24 may open (but not necessarily) when the tool is in position to make measurements in the borehole in order to better mark the fluid with the tracers. The tool is connected to surface equipment via an electrical cable 26. The surface equipment includes a source of electrical power 28 and a recorder 30 to record the signals from the detectors on suitable recording media such as a moveable roll of film which is progressively advanced as a function of either time or depth. The surface instrumentation further includes a depth measuring wheel 32 connected to a depth pulse generator 34 so as to provide a log record of the respective depth locations of the tool. The means for actuating the valves of the chambers 10 and 12 have been represented schematically by the switches 36 and 38.

The tracer-survey tool schematically represented on FIG. 1 is fully described in detail in U.S. Pat. Nos. 4,166,215 and 4,166,216 which are hereby incorporated by reference.

The tracer-survey tool is assumed to eject a line of tracer 40 (FIG. 2) in the flow at time t=0 and at a location x=0, x being along the longitudinal axis of the tool. This line of tracer then advects and disperses downstream through the channel 42 between the tool 2 and the wall 44 of the borehole. The flow at all points is assumed to be uniformly mixed across the channel such that at a time t the tracer concentration is only a function of the axial distance x away from the injection point x=0. The concentration profile is then assumed to have the form of a Gaussian function, but corrected to take into account the velocity of the fluid. It is assumed that this concentration profile is given by:

$$C(x,t) = \frac{C_0}{2\sqrt{\pi kt}} e^{\frac{-(x-Ut)^2}{4kt}} \quad (1)$$

$C_0$ is a constant depending on the initial tracer concentration at the time t=0 and the calibration of the detector, k is the dispersion coefficient of the tracer in the continuous phase, U is the mean velocity of the continuous-phase fluid and $\pi$ is the ratio of the circumference of a circle to its diameter equal to 3.1415. The signal S(t) seen by the detector 20 of length $\Delta x$ is then given by the integral of equation (1) along the length of the detector, assuming that the detector has an undistorted 'view' across the channel. Hence:

$$S(t) = \int_{x_s}^{x_s + \Delta x} C(x,t)dx \quad (2)$$

so that:

$$S(t) = \frac{C_0}{2}\left[ erf\left( \frac{x_s - \Delta x - Ut}{2\sqrt{kt}} \right) - erf\left( \frac{x_s - Ut}{2\sqrt{kt}} \right) \right] \quad (3)$$

where $x_s$ is the distance (FIG. 2) from the ejector located at x=0 to the upstream edge 46 of the detector 20 and "erf" is the error function defined by:

$$erf\, x = \frac{2}{\sqrt{\pi}} \int_0^x e^{-t^2} dt$$

Figure 3:
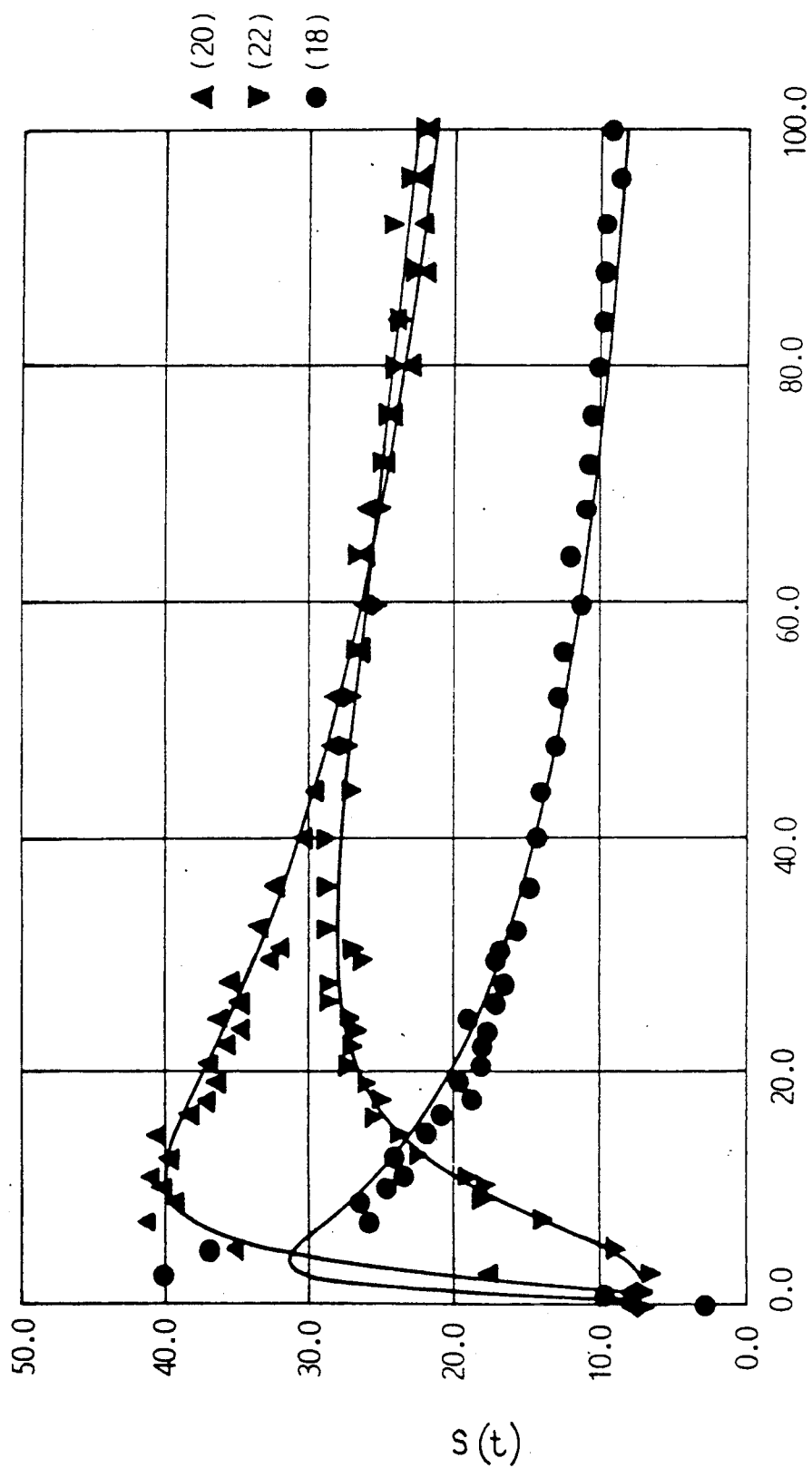
FIG. 3 represents signals obtained by a tracer-survey tool and interpreted in accordance with the invention.

The concentrations of tracer measured by the detectors at succesive times are recorded and plotted. FIG. 3 represents three series of the tracer-concentration data plotted versus time t, each measured by one of the three detectors 18, 20 and 22 of FIG. 1. The correspondence between a series of data and the corresponding detector is indicated on the right side of FIG. 3. From these experimental data, it is obvious that the method of the prior art, consisting in measuring the travel time of the tracer to reach the detector, is difficult to implement due to the "smearing-out" of the signals. In accordance with the invention, each series of data is compared with a signal S(t) given by equation (3) in order to determine the best fit between the experimental data and a signal S(t) with specific values for U and k. In order to determine the best fit, a non-linear least-squares fitting method is used, preferably the one known as the Levenberg-Marquardt method. The software routines described in the book "Numerical Recipies—The Art of Scientific Computing", Cambridge University Press, 1986, could be used for that purpose, although other non-linear least-squares fitting methods could be used. The best fit gives the values of U and k. If the value of the constant $C_o$ is not known, then it could be determined by the same method. The quality of the fit obtained is demonstrated by FIG. 3, which shows the experimental data together with the curve S(t) fitted to each series of experimental data.

Two major assumptions have been made which can be checked and realistic assumptions incorporated if necessary. These are the assumption of a line of tracer injected, when it is obviously a more diffuse cloud, and the assumed uniform sensitivity of the detectors, when this is a function of distance and angle from the detector, which may even be different for different detectors. These 'shape effects' can be easily assessed by experimentation, and then included on the basis of measured sensitivities.

Now that the velocity U of the continuous-phase fluid has been determined, the velocity of the dispersed phase still remains to be determined. Thereafter it is assumed that the flow is composed of two distinct components: a continuous liquid phase (subscript 1) and a dispersed phase distributed as bubbles or droplets (subscript b). It is further assumed that the dispersion coefficient k is wholly caused by the passage of the bubbles. This implies that the tracer is uniformly distributed through the liquid and that all other mixing processes, such as molecular diffusion and pipe flow turbulence, are small in comparison to the bubble-induced mixing.

The mixing induced by the bubbles has a velocity scale going like the slip velocity of the bubble relative to the surrounding fluid, $v_s$, and a length scale going like the bubble diameter $D_b$. This would be expressed mathematically by the expression:

$$k = C_1 v_s D_b \tag{4}$$

where $C_1$ is a constant.

If the bubble Reynolds number is high enough, the drag coefficient of a single bubble may be considered constant, and the rise velocity may be obtained from the balance of drag and buoyancy forces such that:

$$\tfrac{1}{8}\rho_l v_s^2 C_D \pi D_b^2 = (\rho_l - \rho_b)\frac{g\pi D_b^3}{12} \tag{5}$$

g being the acceleration due to gravity, $\rho_l$ and $\rho_b$ the density of the continuous and dispersed phase respectively and $C_D$ the drag coefficient of an individual bubble. This equation is the mere mathematical expression of the fact that the drag force, i.e. the force stopping the bubble to move with an infinite velocity, is equal to the buoyancy force, i.e. the force driving the bubble upwardly, so that the bubble is moving at a constant speed.

Combining equation 4 with equation 5 so as to eliminate $D_b$ leads to a relationship for the slip velocity $v_s$ such that:

$$v_s = C_2 \sqrt[3]{\left(\frac{gk(\rho_l - \rho_b)}{\rho_l}\right)} \tag{6}$$

where $C_2$ is a constant which has a value close to 1. It should be noted that this is a direct relationship for $v_s$ in terms of k, and that the bubble diameter has disappeared from the dependency. The other parameters $\rho_l$ and $\rho_b$ and g are known. If the densities of the two phases are not known, they can be measured at the surface by any appropriate density measurement. $C_2$ is determined empirically by calibration of the tool, in a flow loop for example. To that effect, the dispersion coefficient k and the slip velocity $v_s$ are measured and the value of $C_2$ is obtained by the equation (6). Knowing the value of the dispersion coefficient k from equation (3), the value of $v_s$ is determined from equation (6).

Turning now to the determination of the flow rate of each phase, the volume flow rate $Q_1$ of the continuous-phase fluid is given by:

$$Q_1 = UAy_1 \tag{7}$$

wherein A is the flowing area between the tool and the wall of the borehole, at the level of the detector, and $y_1$ is the hold-up of the continuous phase which is independently determined in a known manner, for example with a differential pressure measurement from a gradiomanometer (such as described in published GB patent application No. 2,186,981) or with a capacitance sensor. The value of A is determined from the geometry of the tool and of the borehole.

The volume flow rate $Q_b$ of the dispersed phase is given by:

$$Q_b = (v_s + U) y_b A \tag{8}$$

where $y_b$ is the holdup of the dispersed phase, equal to $(1 - y_1)$, and $v_s$ is the value of the slip velocity obtained from equation (6).

The preferred embodiment of the invention for determining the dynamic flow characteristics of two phases of a multiphase flow can be summarized by the following steps:

Inject (or activate) a tracer in the continuous phase. This can be done by means of a tracer-survey tool, such as the "TET" or by pulsed neutron activation of oxygen or by other means.

Measure the passage of tracer with time using a suitable detector.

Fit the relationship given in equation (3) to the detector output data, preferably using a non-linear least squares fitting method, using the known geometry to input values of $x_s$ and $d_s$ and deriving from the process values of k and U.

Derive the volumetric flow rate $Q_1$ of the continuous phase by applying equation (7) and by using the value of U and an ancillary measurement of volume fraction, $y_1$, such as given by a differential pressure measurement as in a gradiomanometer tool.

Use equation (6) to evaluate the slip velocity $v_s$, and then calculate the volumetric flow rate $Q_b$ of the dispersed phase from equation (8).

If the flow is composed of more than two phases, for example oil, water and gas, the velocity of the continuous-phase fluid (water) is still measured with a water-soluble tracer and the lightest phase fluid velocity, i.e. the gas velocity, is also determined. The third phase, oil would be considered "neutral", having no substantial effect on the results, and its velocity will not be determined.

The invention has been described in connection with a flow of fluids in a hydrocarbon well. However, the invention can be used also to determine the flow characteristics of multiphase flows in any pipe.

I claim:

1. A method for determining a volumetric flow rate for a continuous phase of a multiphase flow circulating in a pipe, said flow being composed of at least a dispersed phase and the continuous phase, the method comprising the steps of:

discharging or activating a fluid-miscible tracer into the flow at a chosen first location in the pipe for mixing, or activating, at least a portion of the tracer with the continuous phase therein;

measuring the tracer concentration at least a chosen second location in the pipe with a detector as a function of time t so as to obtain at least one series of tracer-concentration data versus time;

fitting a relationship S(t) to the series of data so as to derive the values of the velocity U of the continuous phase and/or the dispersion coefficient k of the tracer in the continuous phase; and measuring the volume fraction $y_1$ of the continuous phase in the pipe and determining the volumetric flow rate $Q_1$ of the continuous phase in accordance with the relationship $$Q_1 = UAy_1$$

wherein A is the flowing area.

2. The method of claim 1, wherein said relationship S(t) is of the form:

$$S(t) = \frac{C_0}{2}\left[ erf\left(\frac{x_s + \Delta x - Ut}{2\sqrt{kt}}\right) - erf\left(\frac{x_s - Ut}{2\sqrt{kt}}\right)\right]$$

wherein $C_o$ is a constant representing the initial tracer concentration, $x_s$ is the distance between the first and second locations, $\Delta x$ is the length of the detector and erf is the error function.

3. The method of claim 1, further comprising the step of determining the slip velocity $v_s$ of the dispersed phase relative to the velocity U of the continuous phase by the following relationship:

$$v_s = C_2 \sqrt[3]{\left(\frac{gk(\rho_l - \rho_b)}{\rho_l}\right)}$$

in which $C_2$ is a constant, g is the acceleration due to gravity and $\rho_l$ and $\rho_b$ are the densities of the continuous and dispersed phases respectively.

4. The method of claim 2 further comprising the step of determining the volumetric flow rate $Q_b$ of the dispersed phase by the following relationship:

$$Q_b = (v_s + U)A(1 - y_1).$$

5. The method of claim 1 wherein the volume fraction $y_1$ is determined with a gradiomanometer.

6. The method of claim 1, in which the tracer concentration is measured as a function of time t at two chosen second and third locations in the pipe, so as to obtain two series of tracer-concentration data, the first location where the tracer is discharged into the flow being either between the second and third locations or upstream of the second and third locations.

7. The method of claim 6 wherein values of the velocity U and dispersion coefficient k are determined for each series of data and are averaged.

8. The method of claim 1, in which the tracer concentration is measured as a function of time t at three chosen second, third and fourth locations in the pipe so as to obtain three series of tracer-concentration data, the first location where the tracer is discharged into the flow being downstream of the third location and upstream of the second and fourth locations.

9. The method of claim 8 wherein values of the velocity U and dispersion coefficient k are determined for each series of data and are averaged.

10. The method of claim 1 wherein the tracer is chosen among salt water, fresh water, dyes, radioactive substances or substances able to be activated by neutrons.

* * * * *